United States Patent
Harima et al.

(10) Patent No.: US 11,923,566 B2
(45) Date of Patent: Mar. 5, 2024

(54) SEALED BATTERY

(71) Applicant: Panasonic Corporation, Kadoma (JP)

(72) Inventors: Yukio Harima, Hyogo (JP); Hiroaki Imanishi, Hyogo (JP)

(73) Assignee: PANASONIC HOLDINGS CORPORATION, Kadoma (JP)

( * ) Notice: Subject to any disclaimer, the term of this patent is extended or adjusted under 35 U.S.C. 154(b) by 237 days.

(21) Appl. No.: 16/975,556

(22) PCT Filed: Nov. 20, 2018

(86) PCT No.: PCT/JP2018/042750
§ 371 (c)(1),
(2) Date: Aug. 25, 2020

(87) PCT Pub. No.: WO2019/167357
PCT Pub. Date: Sep. 6, 2019

(65) Prior Publication Data
US 2020/0403212 A1    Dec. 24, 2020

(30) Foreign Application Priority Data
Feb. 27, 2018    (JP) ................... 2018-033752

(51) Int. Cl.
*H01M 50/574*    (2021.01)
*H01M 50/176*    (2021.01)
(Continued)

(52) U.S. Cl.
CPC ....... *H01M 50/574* (2021.01); *H01M 50/176* (2021.01); *H01M 50/55* (2021.01);
(Continued)

(58) Field of Classification Search
None
See application file for complete search history.

(56) References Cited

U.S. PATENT DOCUMENTS

2010/0143770 A1    6/2010  Onnerud et al.
2015/0295220 A1*  10/2015  Moon .................. H01M 50/176
                                                              429/61

FOREIGN PATENT DOCUMENTS

JP    2010-531042 A    9/2010
JP    2013-229156 A    11/2013
(Continued)

OTHER PUBLICATIONS

JP-6274323-B2 Machine Translation (Year: 2018).*
International Search report dated Feb. 19, 2019, issued in counterpart to Application No. PCT/JP2018/042750. (2 pages).

*Primary Examiner* — Brian R Ohara
*Assistant Examiner* — Patrick Marshall Greene
(74) *Attorney, Agent, or Firm* — WHDA, LLP (57) ABSTRACT

A sealed battery with a current breaking mechanism, and a conductor member that is, inside the battery, electrically connected to the current breaking mechanism, and that is, outside the battery, electrically connected to the positive electrode external terminal. The current breaking mechanism includes a thin plate-like inversion plate in which an outer peripheral portion thereof is connected to the positive electrode collector member, and an inner peripheral portion thereof is connected to the conductor member. The inversion plate is, upon an increase in pressure inside the battery, capable of having the inner peripheral portion become displaced so as to be separated from the conductor member. An accommodating recess that receives the inner peripheral portion of the inverted collector member separated and displaced from the conductor member is formed in the positive electrode collector member and in a thickness direction of the positive electrode collector member.

7 Claims, 9 Drawing Sheets

(51) Int. Cl.
*H01M 50/534* (2021.01)
*H01M 50/536* (2021.01)
*H01M 50/55* (2021.01)
*H01M 50/566* (2021.01)

(52) U.S. Cl.
CPC ........ *H01M 50/534* (2021.01); *H01M 50/536* (2021.01); *H01M 50/566* (2021.01)

(56) References Cited

FOREIGN PATENT DOCUMENTS

| JP | 2016-046158 A | 4/2016 | |
|----|---------------|--------|----|
| JP | 2016-164843 A | 9/2016 | |
| JP | 2016-195025 A | 11/2016 | |
| JP | 6274323 B2 * | 2/2018 | ............ H01M 2/06 |

* cited by examiner

SEALED BATTERY

TECHNICAL FIELD

The present disclosure relates to a sealed battery.

BACKGROUND ART

Hitherto, Patent Literature 1 discloses a power storage device. The power storage device includes a case, an electrode assembly, a collector member, a connection terminal, a conductive member, and an electric current cutoff device. The electric current cutoff device includes a partition wall. When a difference between a pressure of a communication space and a pressure of an isolated space is under a set value, the electric current cutoff device allows a state in which an electric current flows between the collector member and the connection terminal, and when the difference in the pressures of the communication space and the isolated space is equivalent to or larger than the set value, the partition wall is deformed to allow a state in which the electric current does not flow between the collector member and the connection terminal. In the power storage device, while the communication space is formed between the case and the partition wall, the isolated space is formed inside the case.

In the electric current cutoff device in the power storage device of Patent Literature 1 described above, the partition wall is connected to a second end of the collector member in which the first end thereof is electrically connected to the electrode assembly. A thin-walled fragile portion is formed in the second end of the collector member. Furthermore, the isolated space is formed inside the case with respect to a collector connection portion of the partition wall. A lower portion of the isolated space is covered by an isolation member and a lower portion of a housing. A communication hole that is in communication with the inside of the battery is formed in the housing. In the power storage device that includes the electric current cutoff device configured in the above manner, when the pressure of the communication space increases due to an increase in the pressure inside the battery, the partition wall is pushed towards the isolated space side. With the above, the fragile portion of the collector member becomes broken and the partition wall becomes deformed and moves towards the isolated space side and, as a result, the connection between the collector member and the connection terminal is released and the electric current is cut off. According to the power storage device of Patent Literature 1, there is no need to dispose the electric current passage, which connects the collector member and the connection terminal to each other, to go around the partition wall and the isolated space and the electric current passage described can be formed short; accordingly, it is stated that the electrical loss of the power storage device can be made small.

CITATION LIST

Patent Literature

PTL 1: Japanese Published Unexamined Patent Application No. 2013-229156.

SUMMARY OF INVENTION

Due to recent needs of high capacity and quick charging, a battery with good volumetric efficiency is in need. In such a case, since the amount of electric current during charging/discharging has increased, heat generation due to resistance in the components of the electric current passage due to flowing of a large electric current affects the resin members disposed nearby and accelerates the degradation of the resin members, which may have an adverse effect on airtightness and the insulating property.

In the electric current cutoff device of the power storage device of Patent Literature 1 described above, the housing is disposed in a lower surface of the lid member that seals the opening portion of the case, and the partition wall, the isolated space, and the isolation member are disposed or are formed inside the housing. A lower surface of the isolation member is supported by the housing. When a number of members are disposed or are formed in an overlapping manner between the lid member and the electrode assembly, the overlapping dimension of the above becomes large. As a result, the dead space inside the battery case becomes large, which is inappropriate for making the capacity of the battery high.

An object of the present disclosure is to provide a sealed battery appropriate for making the capacity high by reducing the dead space by reducing the thickness of the current breaking mechanism.

A sealed battery according to the present disclosure includes a case including an opening portion, an electrode body housed in the case, a lid member that seals the opening portion of the case, an external terminal provided on an outer surface of the lid member, a collector member in which a first end thereof is electrically connected to an electrode tab extended out from the electrode body and in which a second end thereof is electrically connected to a current breaking mechanism provided inside the battery, and a conductor member provided so as to penetrate through the lid member in an airtight state, in which inside the battery, the conductor member is electrically connected to the current breaking mechanism, and outside the battery, the conductor member is electrically connected to the external terminal. The current breaking mechanism includes a thin plate-like conductive plate in which an outer peripheral portion thereof is connected to the collector member, and an inner peripheral portion thereof is connected to the conductor member. The inner peripheral portion of the conductive plate is formed in a shape that protrudes from a surface of the collector member, and the conductive plate is capable of having, upon increase in the pressure inside the battery, the inner peripheral portion become displaced so as to be separated from the conductor member. An accommodating recess that receives the inner peripheral portion of the inverted conductive plate separated and displaced from the conductor member is formed in the collector member and in a thickness direction of the collector member.

With the sealed battery according to the present disclosure, the thickness of the current breaking mechanism can be reduced and the dead space inside the case can be reduced. As a result, a large space in which the electrode body is disposed can be obtained, which makes the battery suitable for high capacity.

DESCRIPTION OF EMBODIMENTS

Hereinafter, an embodiment according to the present disclosure will be described in detail with reference to the attached drawings. Specific shapes, materials, numerical values, directions, and the like in the present description are described as examples for facilitating understanding of the present disclosure and can be appropriately changed in accordance with the application, the purpose, the specification, and the like. Furthermore, when a plurality of embodiments and modifications are included hereinafter, it is assumed from the start that the plurality of embodiments and modifications are used by appropriately combining characterizing portions thereof.

Figure 1:
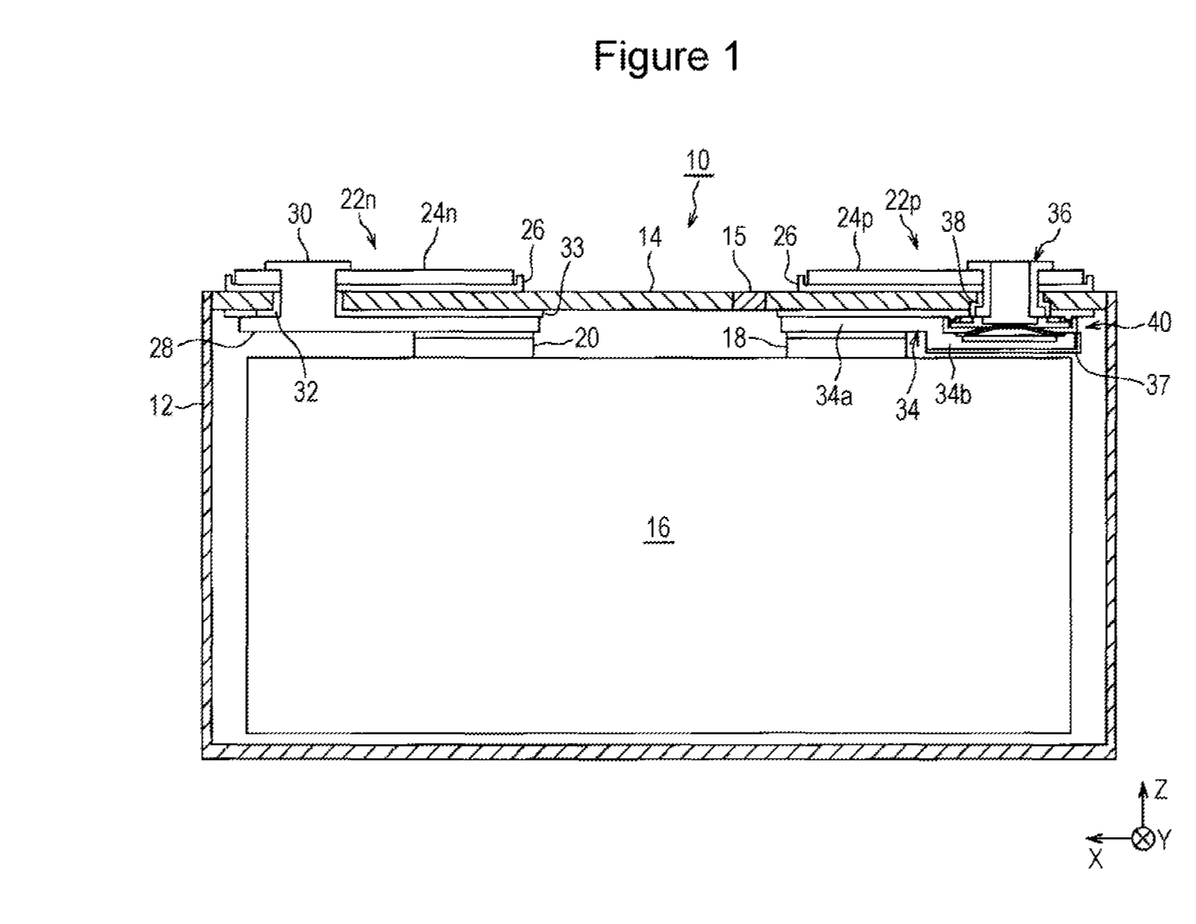
FIG. 1 A longitudinal cross-sectional view of a sealed battery that is an embodiment of the present disclosure.

FIG. 1 is a longitudinal cross-sectional view of a sealed battery 10 that is an embodiment of the present disclosure. In FIG. 1 (similar in FIG. 2), a lateral direction (or a width direction) of the sealed battery 10 is indicated by an arrow X, a length direction of the sealed battery 10 is indicated by an arrow Y, and a longitudinal direction (or an up-down direction, a height direction) of the sealed battery 10 is indicated by an arrow Z. Directions indicated by the arrows X, Y, and Z cross each other at right angles.

As illustrated in FIG. 1, the sealed battery 10 is a laterally long rectangular-shaped square battery. Furthermore, the sealed battery 10 is a flat sealed battery in which a dimension in the length direction Y is small. Moreover, the sealed battery 10 is a dischargeable and chargeable secondary battery such as, for example, a lithium ion battery.

As illustrated in FIG. 1, the sealed battery 10 includes a case 12 formed of metal such as, for example, an aluminum alloy. The case 12 includes a bottom portion and sidewall portions, and includes an opening portion at an upper portion. The opening portion of the case 12 is sealed with a lid member 14. The lid member 14 is configured of a metal plate formed of aluminum alloy or the like. The lid member 14 is fixed to an edge portion of the opening of the case 12 by, for example, laser welding or the like.

An electrode body 16 is housed in the case 12. The electrode body 16 is a stacked-side electrode body configured by stacking a plurality of sheet-shaped positive electrode plates and negative electrode plates with separators interposed therebetween. Details of the positive electrode plates, the negative electrode plates, and the separators will be described later. In the electrode body 16, the plurality of positive electrode plates, negative electrode plates, and separators are arranged integrally with a bundling member such as, for example, an adhesive tape.

Each positive electrode plate constituting the electrode body 16 includes a positive electrode tab (an electrode tab) 18 that is extended from an upper end portion of the positive electrode plate. The positive electrode tabs 18 are provided at an upper end portion and at a portion on a right side in the lateral direction of the electrode body 16 and are disposed so as to be arranged in a thickness direction Y. Furthermore, each negative electrode plate constituting the electrode body 16 includes a negative electrode tab (an electrode tab) 20 that is extended from an upper end portion of the negative electrode plate. The negative electrode tabs 20 are provided at an upper end portion and at a portion on a left side in the lateral direction of the electrode body 16 and are disposed so as to be arranged in the thickness direction Y.

Note that while a case in which the electrode body 16 is a stacked electrode body is described in the present embodiment, the electrode body 16 is not limited thereto. The electrode body may be a wound electrode body configured by winding a positive electrode plate and a negative electrode plate interposed with a separator therebetween.

A negative electrode terminal portion 22n and a positive electrode terminal portion 22p are provided on an upper surface of the lid member 14. The negative electrode terminal portion 22n includes a conductive negative electrode external terminal 24n. The negative electrode external terminal 24n and the lid member 14 are insulated from each other with an insulating member 26 that is a resin member, for example.

The negative electrode tabs 20 that are extended from the electrode body 16 in the case 12 are electrically connected to a first end portion of the negative electrode collector member 28. The negative electrode tabs 20 are joined to the negative electrode collector member 28 by ultrasonic joining, for example.

A conductor member 30 that has a substantially columnar shape is provided at a second end portion of the negative electrode collector member 28 in a protruded manner. The conductor member 30 is suitably configured of a solid metal rivet, for example. The conductor member 30 is joined to the negative electrode collector member 28 by laser welding, for example. The conductor member 30 penetrating through the lid member 14, the insulating member 26, and the negative electrode external terminal 24n extends upwards, and a diameter of an upper end of the outer peripheral portion thereof on the negative electrode external terminal 24n is increased by plastic deformation. With the above, the conductor member 30 is riveted and fixed to the negative electrode external terminal 24n. As a result, each negative electrode plate included in the electrode body 16 is electrically connected to the negative electrode external terminal 24n through the negative electrode collector member 28 and the conductor member 30.

A gasket 32 formed of an insulating resin member, for example, is disposed on an outer periphery of the conductor member 30 so that the conductor member 30 and a through hole of the lid member 14 are sealed in an airtight state. Furthermore, an insulating member 33 is disposed between the negative electrode collector member 28 and the lid member 14; accordingly, the negative electrode collector member 28 and the lid member 14 are electrically insulated from each other.

On the other hand, the positive electrode terminal portion 22p includes a conductive positive electrode external terminal 24p. The positive electrode external terminal 24p and the lid member 14 are insulated from each other with the insulating member 26 that is a resin member, for example. The above insulating member 26 may use the same one as that of the negative electrode terminal portion 22n.

The positive electrode tabs 18 that are extended from the electrode body 16 in the case 12 are electrically connected to a first end portion 34a of the positive electrode collector member 34. The positive electrode tabs 18 are joined to the positive electrode collector member 34 by ultrasonic joining, for example.

The positive electrode collector member 34 is a metal member having conductivity. A second end portion 34b of the positive electrode collector member 34 is electrically connected to a conductor member 36 through a current breaking mechanism 40. While the details will be described later, the conductor member 36 includes a conductive cylindrical member 36a and a conductive columnar member 36b disposed inside the cylindrical member 36a. The conductor member 36 penetrating through the lid member 14, the insulating member 26, and the positive electrode external terminal 24p extends upwards, and a diameter of an upper end of the outer peripheral portion thereof on the positive electrode external terminal 24p is increased by plastic deformation. With the above, the conductor member 36 is riveted and fixed to the positive electrode external terminal 24p. As a result, each positive electrode plate included in the electrode body 16 is electrically connected to the positive electrode external terminal 24p through the positive electrode collector member 34, the current breaking mechanism 40, and the conductor member 36.

A gasket 38 formed of an insulating resin member, for example, is disposed on an outer periphery of the conductor member 36 so that the conductor member 36 and a through hole of the lid member 14 are sealed in an airtight state.

Figure 2:
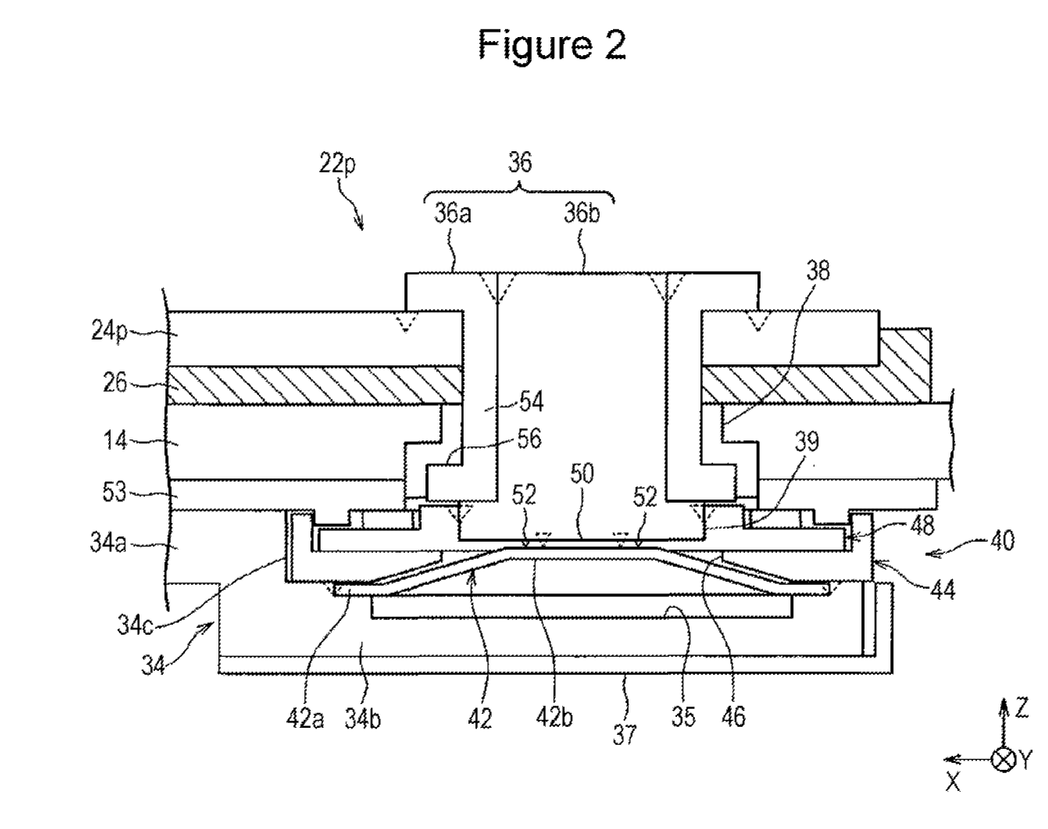
FIG. 2 An enlarged cross-sectional view of a current breaking mechanism in FIG. 1.

In addition to FIG. 1, FIG. 2 will be referred to next to describe the current breaking mechanism (CID: current interrupt device) 40 in the sealed battery 10 of the present embodiment. FIG. 2 is an enlarged cross-sectional view of the current breaking mechanism 40 in FIG. 1. In FIG. 2, welded portions are depicted by broken-lined triangular marks.

As illustrated in FIG. 2, the current breaking mechanism 40 includes an inversion plate 42 and a marking plate 48. The inversion plate 42 is a conductive plate formed of a thin metal plate. An outer peripheral edge portion of the inversion plate 42 is fixed to the second end portion 34b of the positive electrode collector member 34 by, for example, laser welding or the like. More specifically, in a state in which an outer peripheral portion 42a is fitted in a shallow recessed portion formed on an upper surface of the second end portion 34b of the positive electrode collector member 34, the outer peripheral portion 42a of the inversion plate 42 is welded.

An inner peripheral portion 42b of the inversion plate 42 has a truncated cone shape and protrudes from the upper surface (a front surface) of the second end portion 34b of the positive electrode collector member 34. Note that a step portion 34c is formed in the positive electrode collector member 34 between the first end portion 34a and the second end portion 34b, and the upper surface of the second end portion 34b is lower than an upper surface of the first end portion 34a by a height amounting to that of the step portion 34c. Since the upper surface of the second end portion 34b of the positive electrode collector member 34 is low in the above manner, even when the inner peripheral portion 42b of the inversion plate 42 protrudes upwards, the inner peripheral portion 42b of the inversion plate 42 is contained within the height range of the step portion 34c. A front-end flat surface of the inner peripheral portion 42b of the inversion plate 42 is at a lower position with respect to the upper surface of the first end portion 34a of the positive electrode collector member 34. As described above, by providing the step portion 34c in the positive electrode collector member 34 and by containing the protruded inner peripheral portion 42b of the inversion plate 42 within the height of the step portion 34c, the current breaking mechanism 40 can be reduced in thickness.

In the present embodiment, an accommodating recess 35 is formed in the upper surface of the second end portion 34b of the positive electrode collector member 34. The accommodating recess 35 has a function of accommodating the inner peripheral portion 42b when the inner peripheral portion 42b of the inversion plate 42 is inverted and displaced by the increase in the pressure inside the battery. The accommodating recess 35 is formed inside the second end portion 34b of the positive electrode collector member 34 in the thickness direction. Furthermore, the accommodating recess 35 is formed in a shape including a flat columnar-shaped space. An inner space of the accommodating recess 35 is a space sealed by welding the entire periphery of the outer peripheral portion 42a of the inversion plate 42.

A lower surface of the second end portion 34b of the positive electrode collector member 34 is covered by an insulating member 37 in which a lateral surface forms an L-shape. As illustrated in FIG. 1, insulation between the second end portion 34b of the positive electrode collector member 34 and the electrode body 16 positioned at a lower vicinity thereof is obtained with the insulating member 37.

As illustrated in FIG. 2, an insulating spacer member 44 is disposed on the outer peripheral portion 42a of the inversion plate 42. The spacer member 44 includes a circular opening portion 46 at the center thereof. The spacer member 44 is provided so as to cover up to the middle position of the inner peripheral portion 42b of the inversion plate 42, and the front-end flat portion of the inner peripheral portion 42b of the inversion plate 42 is positioned so as to protrude upwards from the opening portion 46 of the spacer member 44.

Four sides of an upper surface of the spacer member 44 are surrounded by sidewalls, and the marking plate (a breaking plate) 48 is disposed on the upper surface. The marking plate 48 is configured of a metal member. While details will be described later, the marking plate 48 is fixed to the spacer member 44 by thermal caulking.

A fitted recessed portion 50 that is circular in upper surface view is formed in the upper surface of the marking plate 48. A bottom surface of the fitted recessed portion 50 is formed in a thin plate shape, and a thin-walled fragile portion 52 formed of a V-shaped groove having a round shape in upper surface view is formed on the bottom surface. On an inner peripheral side of the fragile portion 52, the bottom surface of the fitted recessed portion 50 of the marking plate 48 and the front-end flat portion of the inner peripheral portion 42b of the inversion plate 42 are joined to each other by, for example, laser welding or the like.

The marking plate 48 is electrically connected to a lower end portion of the conductor member 36. Specifically, the conductor member 36 is configured of the cylindrical member 36a formed of metal, and the columnar member 36b that is formed of metal and that is inserted and disposed inside the cylindrical member 36a. The columnar member 36b includes a flange portion 39 at a lower end portion thereof and the flange portion 39 is fitted and disposed in the fitted recessed portion of the marking plate 48. Furthermore, an edge portion of the fitted recessed portion that is a portion positioned on the outer peripheral side with respect to the fragile portion 52, and an outer peripheral edge portion of the flange portion 39 that is a first end portion of the conductor member 36 are, for example, joined to each other by laser welding or the like. With the above, the marking plate 48 and the columnar member 36b of the conductor member 36 are electrically connected to each other.

An insulating member 53 formed of a resin member is disposed between the marking plate 48 and the first end portion 34a of the positive electrode collector member 34, and the lid member 14. With the above, the marking plate 48 and the positive electrode collector member 34, and the lid member 14 are electrically insulated from each other.

The columnar member 36b of the conductor member 36 is inserted and disposed inside the cylindrical member 36a. The columnar member 36b is inserted from below the cylindrical member 36a, and the position is set by the flange portion 39 abutting against the lower end portion of the cylindrical member 36a.

The cylindrical member 36a of the conductor member 36 includes a cylindrical portion 54 and a lower flange portion 56 formed at the lower end portion of the cylindrical portion 54. Furthermore, the lid member 14 and the cylindrical member 36a of the conductor member 36 are sealed in an airtight state with respect to each other with the gasket 38 in contact with and disposed across a lower outer peripheral surface of the cylindrical portion 54 and an outer peripheral surface of the lower flange portion 56.

In the conductor member 36, an outer periphery of an upper end portion of the columnar member 36b inserted and disposed inside the cylindrical portion 36a is joined to an inner periphery of an upper end of the cylindrical portion 54 by, for example, laser welding or the like. With the above, in the conductor member 36, the columnar member 36b is electrically connected to the cylindrical member 36a in a reliable manner.

An upper end portion of the cylindrical member 36a of the conductor member 36 is plastically deformed and forms an upper flange portion. The upper flange portion fixes the cylindrical member 36a to the positive electrode external terminal 24p. Furthermore, an outer peripheral portion of the upper flange portion of the cylindrical member 36a is joined to the positive electrode external terminal 24p by, for example, laser welding or the like. With the above, the cylindrical member 36a of the conductor member 36 is electrically connected to the positive electrode external terminal 24p in a reliable manner.

Figure 3:
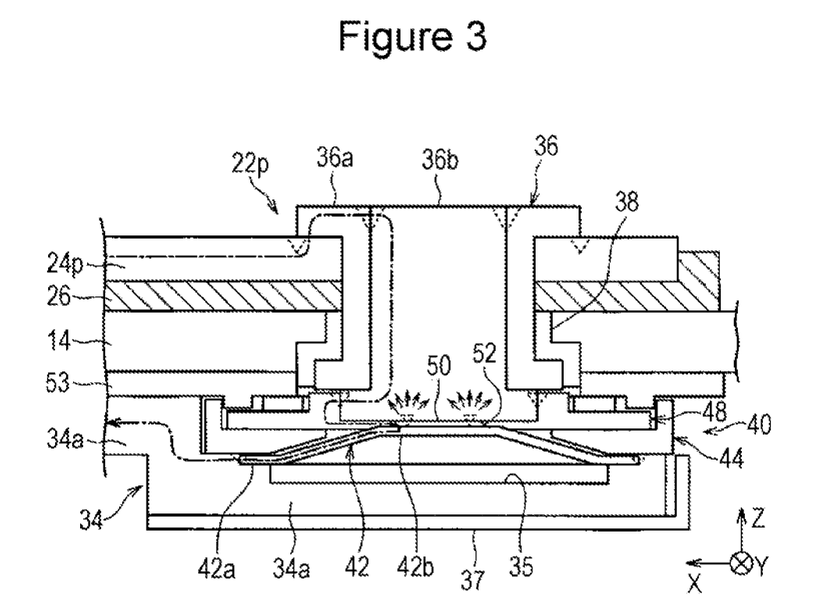
FIG. 3 Illustrates a state in which heat is generated in the current breaking mechanism during quick charging.

FIG. 3 illustrates a state in which heat is generated in the current breaking mechanism 40 during quick charging. In FIG. 3, the electric current flowing through the positive electrode terminal portion 22p during quick charging is depicted by a dot and dash line.

As illustrated in FIG. 3, during quick charging, an electric current with a large value flows through the welded portions (the broken-lined triangular marks) between the members. This is because the electric resistance in each welded portion is smaller than those of the other contact portions between the members. Specifically, the electric current during quick charging flows from the positive electrode external terminal 24p and sequentially to the cylindrical member 36a of the conductor member 36, the columnar member 36b, the marking plate 48, and the inversion plate 42, flows from the outer peripheral welded portions of the inversion plate 42 to the positive electrode collector member 34, and is charged to the electrode body 16 through the positive electrode collector member 34.

In such an electric current passage, since the fragile portion 52 of the marking plate 48 is thin walled due to the V-shaped groove and the electric resistance is large, heat generation due to resistance is large. In FIG. 3, the manner in which the heat generation due to resistance in the fragile portion 52 becomes large is depicted by a number of small arrows. Furthermore, since the inversion plate 42 is also configured of a thin metal plate, the electric resistance is relatively large and the heat generation due to resistance is large. When such heat generation due to resistance is transmitted to the resin member disposed close by and when the resin member becomes high in temperature, degradation of the resin member may be accelerated and the airtightness and the insulating property of the resin member may be affected in an adverse manner.

In the sealed battery 10 of the present embodiment, the columnar member 36b of the conductor member 36 is disposed so as to be in contact with the bottom surface of the fitted recessed portion 50 in which the fragile portion 52 of the marking plate 48 is provided. The columnar member 36b has a large thermal capacity and can effectively release heat to a portion external to the battery by transmitting the heat to the upper end portion. Accordingly, even when heat generation due to resistance occurs in the fragile portion 52 of the marking plate 48 and in the vicinity thereof during quick charging, the gasket 38, which is a resin member, does not easily become high in temperature due to the heat being transmitted thereto. As a result, a decrease in the airtightness and in the insulating property caused by acceleration in the degradation of the gasket 38 due to the thermal effect can be suppressed.

Such heat generation due to resistance also occurs when a large electric current is discharged from the sealed battery 10 when used with a high load; accordingly, it is also effective as a measure to suppress transmission of heat to the gasket 38 when used with a high load.

Furthermore, in the sealed battery 10 of the present embodiment, the gasket 38 that seals the outer periphery of the conductor member 36 is disposed so as to be, through the cylindrical member 36a, set apart from the columnar member 36b that becomes high in temperature due to the heat generation of the marking plate 48 and the inversion plate 42. Moreover, while the outer peripheral surface of the columnar member 36b is disposed so as to be in contact with the inner peripheral surface of the cylindrical member 36a, there is a slight gap in between the two. As described above, by having the cylindrical member 36a be interposed between the columnar member 36b and the gasket 38 and by having the slight gap described above, heat is not easily transmitted to the gasket 38 from the columnar member 36b. As a result, the gasket 38 is not easily thermally affected and a decrease in the airtightness and in the insulating property caused by the acceleration in the degradation of the gasket 38 can be suppressed.

Figure 4:
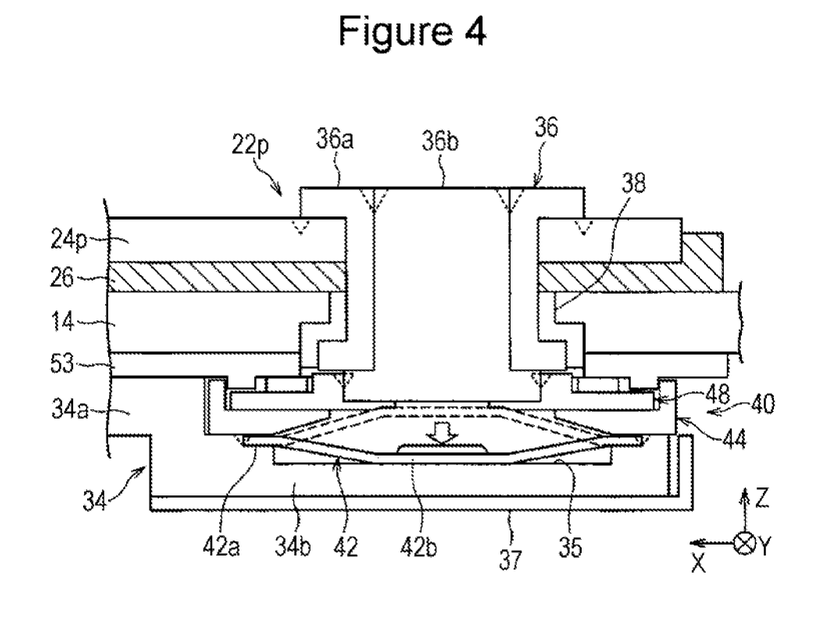
FIG. 4 A diagram illustrating a state in which the current breaking mechanism is activated.

FIG. 4 is a diagram illustrating a state in which the current breaking mechanism 40 is activated. When the pressure inside the battery increases to a value equivalent to or larger than a predetermined set value due to a cause such as internal short-circuiting, the inclined upper surface of the inner peripheral portion 42b of the inversion plate 42 in the current breaking mechanism 40 provided inside the battery receiving the pressure is pushed downwards. With the above, as illustrated in FIG. 4, the fragile portion 52 of the fitted recessed portion 50 of the marking plate 48 is broken and the inner peripheral portion 42b of the inversion plate 42 is inverted and displaced so as to be protruded downwards. In other words, the inversion plate 42 is separated from the marking plate 48 and the conductor member 36. In so doing, the inner peripheral portion 42b of the inversion plate 42 is plastically deformed so as to be protruded downwards and is accommodated in the accommodating recess 35. As a result, the electric current passage in the positive electrode terminal portion 22p is broken between the marking plate 48 and the inversion plate 42 and, accordingly, the electric current is cut off.

Since the current breaking mechanism 40 that operates in the above manner forms the accommodating recess 35 that accommodates the inner peripheral portion 42b of the inversion plate 42, which is inverted and deformed when the pressure inside the battery increases, inside the second end portion 34b of the positive electrode collector member 34 in the thickness direction, even when the inversion space is provided below the inversion plate 42, the dimension of the current breaking mechanism 40 in the longitudinal direction can be set small. Accordingly, the dead space formed in the case 12 between the lid member 14 and the electrode body 16 can be small and the battery can be appropriate for high capacity.

Referring next to FIGS. 5 to 16, a manufacturing process of the sealed battery 10 of the present embodiment will be described.

Figure 5:
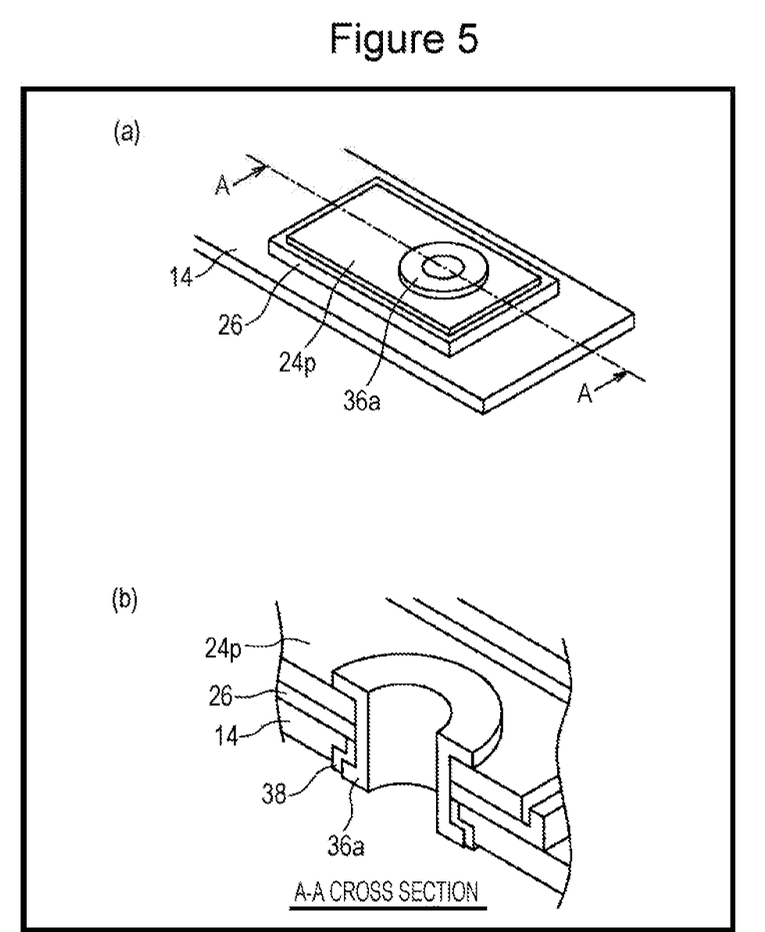
FIG. 5 A perspective view (a) illustrating the assembling of the sealed battery, and an A-A cross-sectional view (b).
Figure 6:
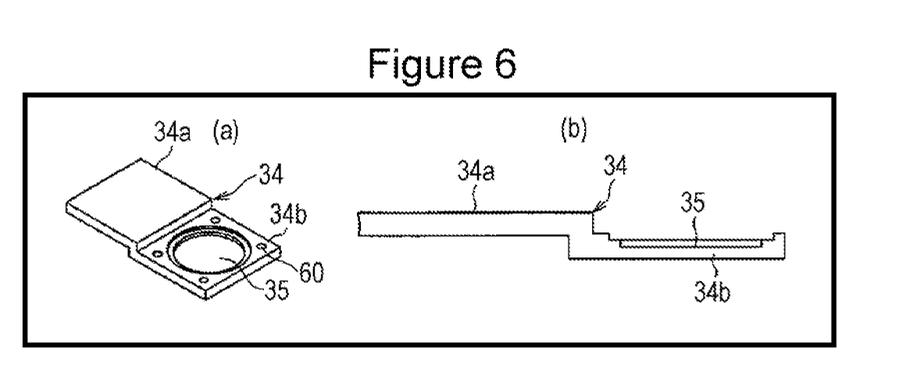
FIG. 6 Subsequent to FIG. 5, a perspective view (a) illustrating the assembling of the sealed battery, and a cross-sectional view (b).

As in the manner illustrated in FIGS. 5(a) and 5(b), first, the positive electrode external terminal 24p is mounted on the lid member 14. More specifically, the gasket 38 is inserted and disposed into the through hole of the lid member 14 from below, and the cylindrical portion of the cylindrical member 36a of the conductor member 36 is inserted inside the gasket 38 from below. Subsequently, the insulating member 26 and the positive electrode external terminal 24p are fitted and disposed at the upper end of the cylindrical portion of the cylindrical member 36a that protrudes from the upper surface of the lid member 14, and in the above state, the upper end of the cylindrical portion of the cylindrical member 36a is reverted and fixed.

Subsequently, as illustrated in FIGS. 6 to 10, the inversion plate 42 and the like of the positive electrode collector member 34 are mounted. As illustrated in FIGS. 6(a) and 6(b), first, the positive electrode collector member 34 is prepared. A through hole 60 that penetrates in the thickness direction is formed in each of the four corners of the second end portion 34b of the positive electrode collector member.

Figure 7:
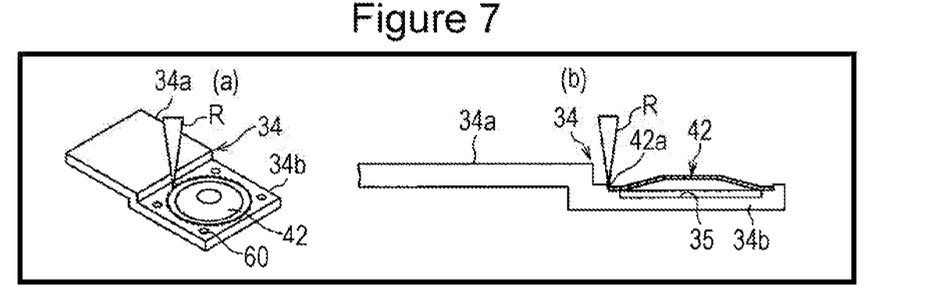
FIG. 7 Subsequent to FIG. 6, a perspective view (a) illustrating the assembling of the sealed battery, and a cross-sectional view (b).

Subsequently, as illustrated in FIGS. 7(a) and 7(b), the inversion plate 42 is mounted on the upper surface of the second end portion 34b of the positive electrode collector member 34, and the outer peripheral portion 42a of the inversion plate 42 is fixed by laser welding, for example. In FIG. 7 (similar in FIG. 10 and the like), a laser R that welds the inversion plate 42 is depicted by an outlined triangle.

Figure 8:
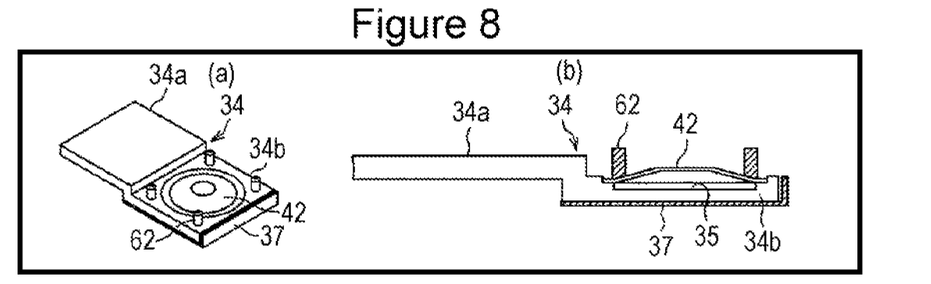
FIG. 8 Subsequent to FIG. 7, a perspective view (a) illustrating the assembling of the sealed battery, and a cross-sectional view (b).

Subsequently, as illustrated in FIGS. 8(a) and 8(b), the insulating member 37 is mounted on the lower surface of the second end portion 34b of the positive electrode collector member 34. Four pin portions 62 are protrudedly provided in the insulating member 37 formed of thermoplastic resin, and the insulating member 37 is mounted while the pin portions 62 are inserted through the four through holes 60 formed in the second end portion 34b of the positive electrode collector member 34.

Figure 9:
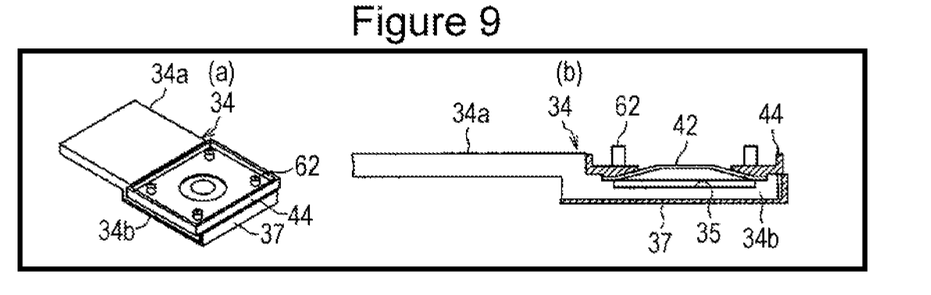
FIG. 9 Subsequent to FIG. 8, a perspective view (a) illustrating the assembling of the sealed battery, and a cross-sectional view (b).

Subsequently, as illustrated in FIGS. 9(a) and 9(b), the spacer member 44 is mounted on the upper surface of the second end portion 34b of the positive electrode collector member 34. Through holes are also formed in four corners of the spacer member 44, and the spacer member 44 is mounted while the pin portions 62 of the insulating member 37 are inserted through the through holes. In so doing, the distal end portions of the pin portions 62 are protruded from the upper surface of the spacer member 44.

Figure 10:
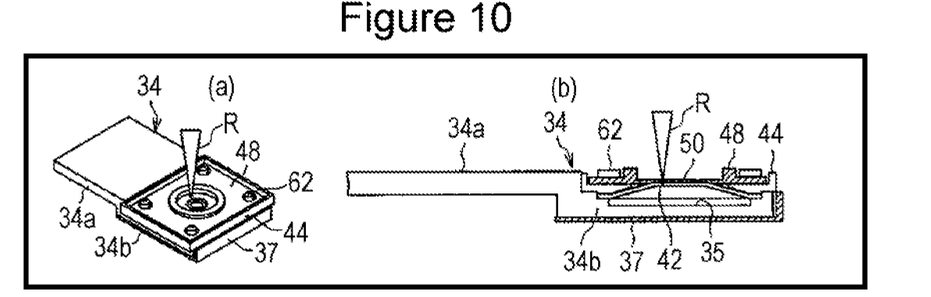
FIG. 10 Subsequent to FIG. 9, a perspective view (a) illustrating the assembling of the sealed battery, and a cross-sectional view (b).

Subsequently, as illustrated in FIGS. 10(a) and 10(b), the marking plate 48 is mounted on the spacer member 44. Through holes are also formed in four corners of the marking plate 48, and the marking plate 48 is mounted while the pin portions 62 of the insulating member 37 are inserted through the through holes. In so doing, the distal end portions of the pin portions 62 are protruded from the upper surface of the marking plate 48.

In the above state, the distal end portions of the pin portions 62 are press heated to crush the distal ends. With the above, the insulating member 37, the spacer member 44, and the marking plate 48 are integrally fixed to the second end portion 34b of the positive electrode collector member 34 by thermal caulking. Furthermore, an inner peripheral portion of the fragile portion 52 of the marking plate 48 is joined in a circular manner by laser welding. With the above, the marking plate 48 and the inversion plate 42 are electrically connected to each other.

Figure 11:
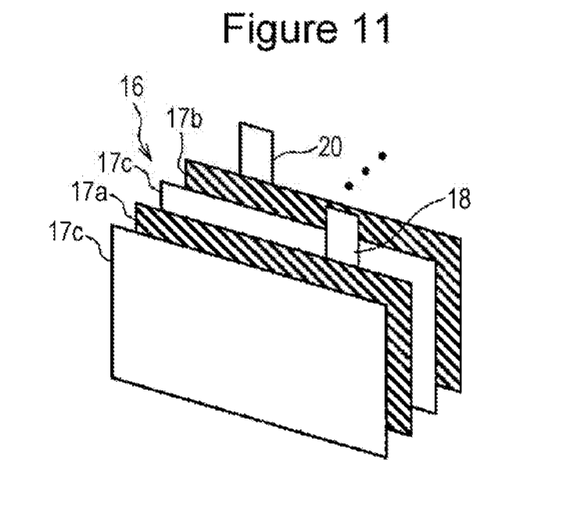
FIG. 11 A perspective view illustrating a configuration of an electrode body of the sealed battery.

FIG. 11 is a perspective view illustrating a configuration of the electrode body 16 of the sealed battery 10. The electrode body 16 is configured by stacking a plurality of positive electrode plates 17a and a plurality of negative electrode plates 17b each formed in a sheet shape with a separator 17C interposed in between each of the positive electrode plate 17a and the negative electrode plate 17b. The positive electrode tab 18 formed in a rectangular shape extends out from an edge portion of an upper end of each positive electrode plate 17a, and the negative electrode tab 20 formed in a rectangular shape extends out from an edge portion of an upper end of each negative electrode plate 17b at a position shifted in the lateral direction with respect to the positive electrode tab 18.

The positive electrode plates 17a, the negative electrode plates 17b, and the separators 17c, in a case in which the sealed battery 10 is a lithium ion battery, will be described next. The positive electrode plate 17a is configured by forming a positive electrode active material containing layer on both surfaces of a foil-like positive electrode core body. The positive electrode core body is formed of aluminum or aluminum alloy foil, for example. The positive electrode tab 18 is formed by the positive electrode core body itself in which the positive electrode active material containing layer is not formed.

The positive electrode active material containing layer can be fabricated by, for example, using lithium nickel oxide as the positive electrode active material, using acetylene black (AB) as a conducting agent, using polyvinylidene fluoride (PVDF) as a binding agent, and using N-methyl-2-pyrrolidone as a dispersion medium. Describing the positive electrode active material in a further detail, any chemical compound that can reversibly absorb/release lithium ion can be appropriately selected and used as the positive electrode active material. Lithium transition metal composite oxide is desirable for the positive electrode active material. For example, a lithium transition metal composite oxide expressed as $LiMo_2$ (note that M is at least one of Co, Ni, and Mn) that is capable of reversibly absorbing/releasing lithium ion, in other words, one of or a mixture of a plurality of $LiCoO_2$, $LiNiO_2$, $LiNi_yCo_{1-y}O_2$ (y=0.01-0.99), $LiMnO_2$, $LiCo_xMn_yNi_zO_2$ (x+y+z=1), and $LiMn_2O_4$ or $LiFePO_4$ can be used. Moreover, lithium cobalt composite oxide to which a dissimilar metal element such as zirconium, magnesium, aluminum, or tungsten is added can be used as well. However, the positive electrode active material containing layer may be fabricated of any other known materials.

The positive electrode plate 17a is fabricated in the following manner, for example. A conducting agent, a binding agent, and the like are mixed with the positive electrode active material, and the above mixture is kneaded and mixed inside a dispersion medium to fabricate paste-like positive electrode active material slurry. After the above, the positive electrode active material slurry is coated on the positive electrode core body. Subsequently, the positive electrode active material slurry coated on the positive electrode core body is dried and compressed to form a positive electrode active material containing layer. Subsequently, the positive electrode core body and the positive electrode active material containing layer are cut by laser fusion cutting and the like, for example, to form the positive electrode plate 17a including the positive electrode tab 18.

The negative electrode plate 17b is configured by forming a negative electrode active material containing layer on both surfaces of a foil-like negative electrode core body. The negative electrode core body is formed of copper or copper alloy foil, for example. The negative electrode tab 20 is formed by the negative electrode core body itself in which the negative electrode active material containing layer is not formed.

The negative electrode active material of the negative electrode active material containing layer is not limited to any particular material as long as lithium can be reversibly absorbed/released and, for example, a carbon material, a silicon material, lithium metal, metal or an alloy material that becomes alloyed with lithium, metal oxide, or the like can be used. Note that from the viewpoint of material cost, desirably, a carbon material such as, for example, natural graphite, artificial graphite, mesophase-pitch-based carbon fiber (MCF), mesocarbon microbeads (MCMB), coke, or hard carbon is used in the negative electrode active material. In particular, from the viewpoint of improving the high-rate charge-discharge characteristics, desirably, a carbon material in which a graphite material is coated with a low crystalline carbon is used as the negative electrode active material.

Furthermore, desirably, the negative electrode active material containing layer is fabricated by using styrene-butadiene copolymer rubber particle dispersion (SBR) as the binding agent, using carboxymethyl-cellulose (CMC) as a thickener, and using water as the dispersion medium. The negative electrode active material containing layer is fabricated in the following manner, for example. A conducting agent, a binding agent, and the like are mixed with the negative electrode active material, and the above mixture is kneaded and mixed inside a dispersion medium to fabricate paste-like negative electrode active material slurry. After the above, the negative electrode active material slurry is coated on the negative electrode core body. Subsequently, when the negative electrode active material slurry coated on the negative electrode core body is dried and compressed, a negative electrode active material containing layer is formed. Subsequently, the negative electrode core body and the negative electrode active material containing layer are cut by laser fusion cutting and the like, for example, to form the negative electrode plate 17b including the negative electrode tab 20.

A known separator that is generally used in a nonaqueous electrolyte secondary battery can be used as the separator 17C. For example, a separator formed of polyolefin is desirable. Specifically, not only a separator formed of polyethylene, a separator in which a layer of polypropylene is formed on surfaces of polyethylene, or a separator in which an aramid resin is coated on surfaces of a polyethylene separator may be used.

An inorganic filler layer may be formed at a boundary between each positive electrode plate 17a and the corresponding separator 17C or at a boundary between each negative electrode plate 17b and the corresponding separator 17C. As the filler, a filler formed of an oxide or a phosphate compound that uses one or some of titanium, aluminum, silicon, magnesium, and the like, or a filler in which hydroxide is treated on the surfaces of the oxide or the phosphate compound may be used. Furthermore, the filler layer may be formed by directly coating a filler containing slurry on the positive electrode plate 17a, the negative electrode plate 17b, or the separator 17C, or may be formed by adhering a sheet formed of filler to the positive electrode plate 17a, the negative electrode plate 17b, or the separator 17C.

Figure 12:
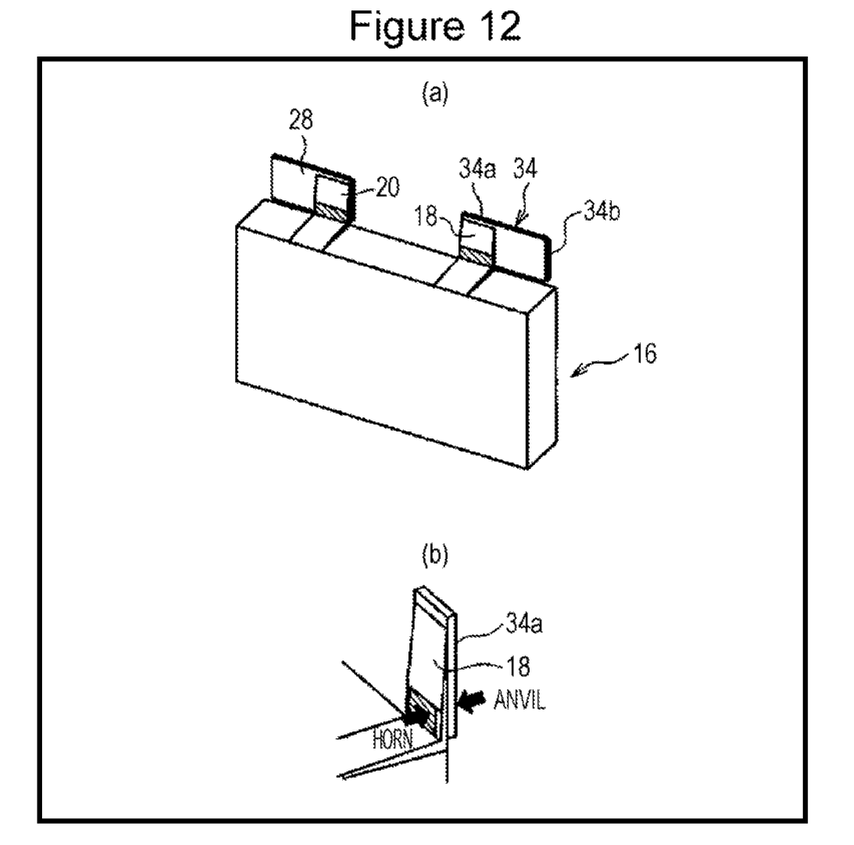
FIG. 12 Subsequent to FIG. 9, a perspective view (a) illustrating the assembling of the sealed battery, and (b), a perspective view illustrating ultrasonic joining.

In FIG. 12, (a) is a perspective view illustrating the assembling of the sealed battery 10 subsequent to FIG. 9, and (b) is a perspective view illustrating ultrasonic joining. As illustrated in FIG. 12(a), the positive electrode collector member 34 is joined to the positive electrode tabs 18 of the electrode body 16, and the negative electrode collector member 28 is joined to the negative electrode tabs 20.

Note that as described by referring to FIGS. 6 to 10, the positive electrode collector member 34 in which the inversion plate 42, the insulating member 37, the spacer member 44, and the marking plate 48 are integrally fixed to the second end portion 34b and in which the marking plate 48 and the inversion plate 42 are electrically connected to each other is used. The first end portion 34a of the positive electrode collector member 34 in which the inversion plate 42 and the like are mounted in the second end portion 34b in the above manner is overlapped with the plurality of positive electrode tabs 18 extending out from the electrode body 16, and ultrasonic joining is performed after an ultrasonic horn and an anvil interpose the above in between. With the above, each positive electrode tab 18 and the positive electrode collector member 34 are electrically connected to each other.

As the method of joining the positive electrode tabs 18 and the positive electrode collector member 34 to each other, resistance welding is inappropriate since aluminum, which is the positive electrode core body, adheres to the welding rod, and in laser welding, it is inappropriate to join a number of positive electrode tabs 18 in a stacked state to the positive electrode collector member 34 since foil tear and foil thinning of the aluminum foils constituting the positive electrode tabs 18 occur. Accordingly, ultrasonic joining is suitable as the method joining the positive electrode tabs 18 and the positive electrode collector member 34 to each other.

However, in ultrasonic joining, in a state in which the constituent members (for example, the inversion plate 42 and the like) of the lid member 14 and the current breaking mechanism 40 are, in addition to the positive electrode tabs 18 and the positive electrode collector member 34, overlapped, the ultrasonic horn and the anvil cannot interpose them. However, in the sealed battery 10 of the present embodiment, ultrasonic joining can be performed while only the positive electrode tabs 18 and the positive electrode collector member 34 are interposed between the ultrasonic horn and the anvil, and a number of positive electrode tabs can be reliably joined to the positive electrode collector member 34.

Furthermore, as illustrated in FIG. 12(*a*), when the negative electrode collector member 28 is joined to the negative electrode tabs 20 extending out from the electrode body 16, ultrasonic joining is suitably used for a similar reason. Note that the conductor member 30 (see FIG. 1) can be attached in advance to the negative electrode collector member 28 that is joined to the negative electrode tabs 20, or the conductor member 30 can be attached to the negative electrode collector member 28 after the negative electrode collector member 28 is joined to the negative electrode tabs 28.

Figure 13:
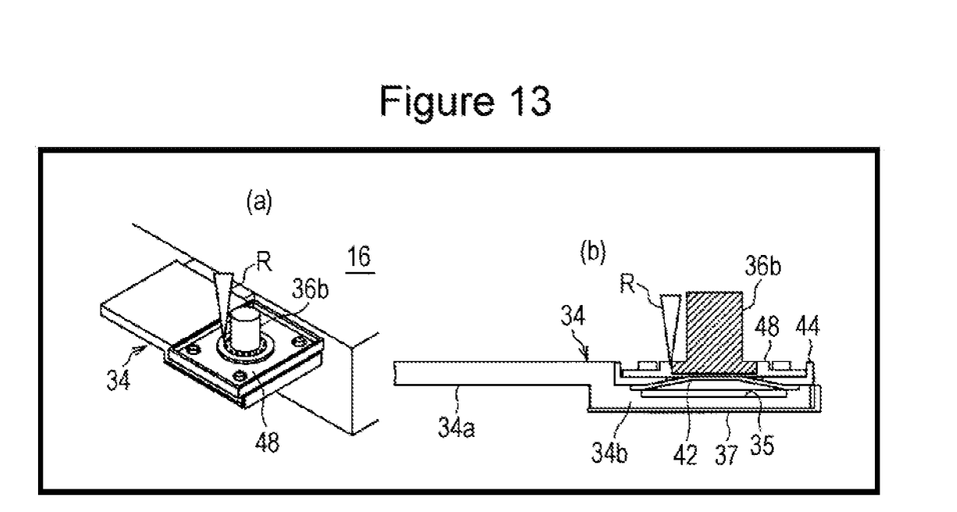
FIG. 13 Subsequent to FIG. 12, a perspective view (a) illustrating the assembling of the sealed battery, and a cross-sectional view (b).

Subsequently, as illustrated in FIGS. 13(*a*) and 13(*b*), a lower end portion of the columnar member 36*b* is joined to the marking plate 48 fixed to the positive electrode collector member 34 by, for example, laser welding or the like.

Figure 14:
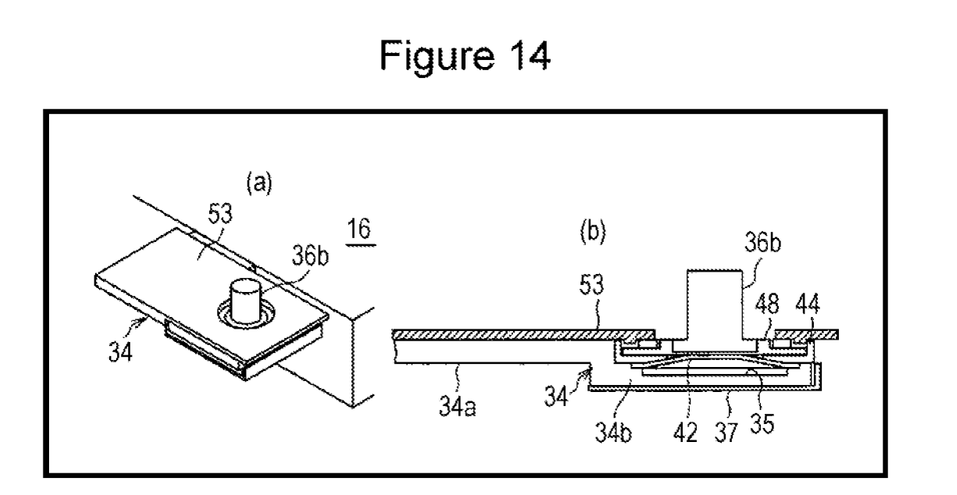
FIG. 14 Subsequent to FIG. 13, a perspective view (a) illustrating the assembling of the sealed battery, and a cross-sectional view (b).

Subsequently, as illustrated in FIGS. 14(*a*) and 14(*b*), the insulating member 53 is installed on the positive electrode collector member 34. A rectangular frame-shaped protruded portion is formed on the back surface of the insulating member 53, and the position of the insulating member 53 is set with respect to the positive electrode collector member 34 through the spacer member 44 by having the protruded portion be fitted into rectangular frame-shaped lateral walls of the spacer member 44. Furthermore, while not illustrated in the drawing, the insulating member 33 is mounted on the negative electrode collector member 28.

Figure 15:
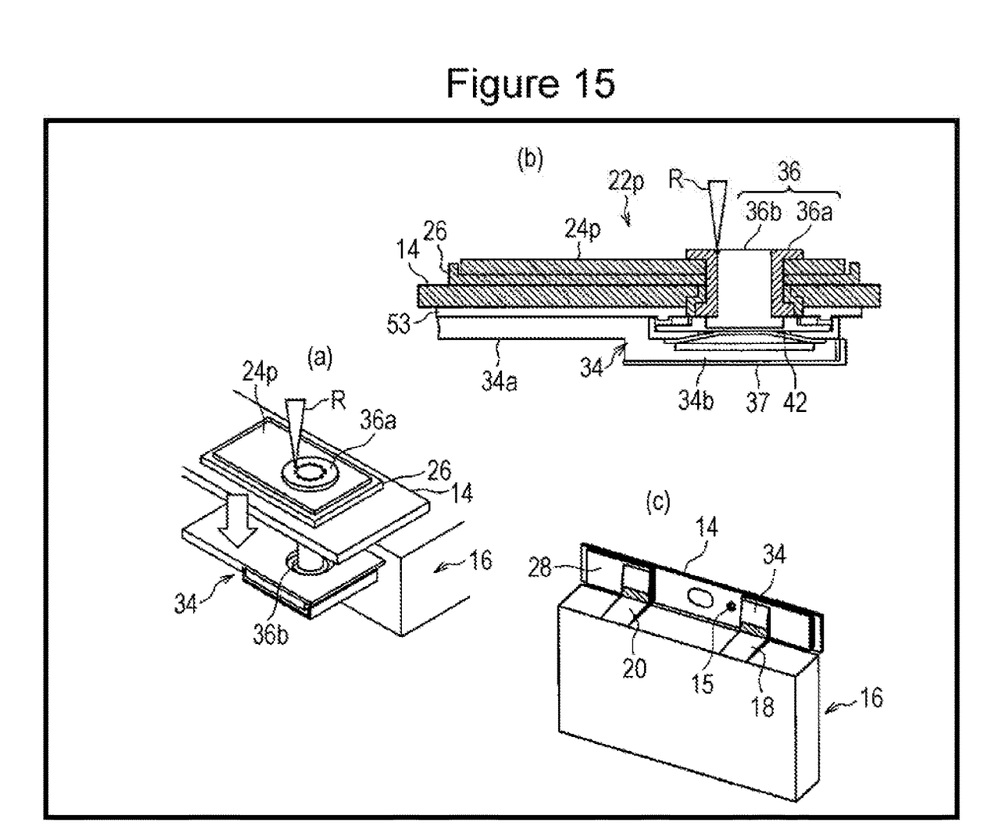
FIG. 15 Subsequent to FIG. 14, a perspective view (a) illustrating the assembling of the sealed battery, and a cross-sectional view (b), and (c), a perspective view of the electrode body and a lid member.

As illustrated in FIGS. 15(*a*) and 15(*b*), subsequently, the lid member 14 described with reference to FIG. 5 is mounted on the positive electrode collector member 34 attached to the electrode body 16. Specifically, the columnar member 36*b* attached to the positive electrode collector member 34 is inserted into the cylindrical member 36*a* attached to the lid member 14, and the outer periphery of the upper end portion of the columnar member 36*b* and the inner periphery of the upper end portion of the cylindrical member 36*a* are joined to each other by, for example, laser welding or the like. With the above, the columnar member 36*b* and the cylindrical member 36*a* are fixed to each other and are electrically connected to each other. Furthermore, regarding the negative electrode collector member 28, the conductor member 30 fixed to the negative electrode collector member 28 in advance is disposed so as to be penetrated through the lid member 14, the insulating member 26, and the negative electrode external terminal 24*n*. With the above, as illustrated in FIG. 15(*c*), the positive electrode collector member 34 and the negative electrode collector member 28 connected to the electrode body 16 is mounted on the lid member 14.

Figure 16:
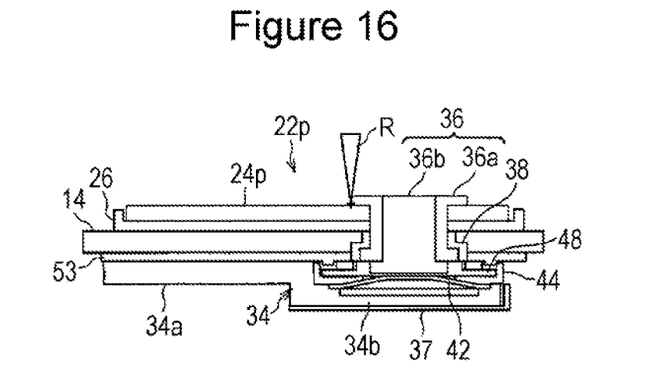
FIG. 16 Subsequent to FIG. 15, a cross-sectional view illustrating the assembling of the sealed battery.

Subsequently, as illustrated in FIG. 16, the outer periphery of the upper end portion of the cylindrical member 36*a* of the conductor member 36 and the positive electrode external terminal 24*p* are joined to each other by, for example, laser welding or the like. With the above, an electric current of the positive electrode terminal portion 22*p* from the positive electrode tabs 18 of the electrode body 16, through the positive electrode collector member 34, the inversion plate 42, the marking plate 48, the columnar member 36*b*, and the cylindrical member 36*a*, and to the positive electrode external terminal 24*p* is formed.

Furthermore, regarding the negative electrode terminal portion 22*n*, first, the upper end portion of the conductor member 30 is riveted and fixed, and the outer periphery of the riveted upper end portion is joined to the negative electrode external terminal 24*n* by, for example, laser welding or the like. With the above, an electric current passage of the negative electrode terminal portion 22*n* from the negative electrode tabs 20 of the electrode body 16, through the negative electrode collector member 28 and the conductor member 30, and to the negative electrode external terminal 24*n* is formed.

The electrode body 16 coupled to the lid member 14 in the above manner is accommodated in the case 12 (see FIG. 1) from above, and the opening portion of the case 12 is closed by the lid member 14. Subsequently, the entire outer periphery of the lid member 14 is joined in an airtight state by, for example, laser welding or the like. With the above, the assembling of the sealed battery 10 is completed.

Lastly, an injection hole 15 is sealed after injecting a non-aqueous electrolyte solution through the injection hole 15 (see FIG. 1) of the lid member 14. With the above, manufacturing of the sealed battery 10 is completed.

A solvent of the nonaqueous electrolyte is not limited to any solvent in particular and a solvent that has been conventionally used can be used in the nonaqueous electrolyte secondary battery. For example, cyclic carbonate such as ethylene carbonate (EC), propylene carbonate (PC), butylene corbonate, vinylene corbonate (VC); chain carbonate such as dimethyl carbonate (DMC), methyl carbonate (MEC), diethyl carbonate (DEC); a chemical compound containing ester such as methyl acetate, ethyl acetate, propyl acetate, methyl propionate, ethyl propionate, γ-butyrolactone; a chemical compound containing a sulfone group such as propane sultone; a chemical compound containing ester such as 1,2-Dimethoxyethane, 1,2-Diethoxyethane, tetrahydrofuran, 1,2-Dioxane, 1,4-Dioxane, 2-Methyltetrahydrofuran; a chemical compound containing nitrile such as butyronitrile, valeronitrile, n-Heptanenitrile, succinonitrile, glutarnitrile, adiponitrile, pimeronitrile, 1,2,3-Propanetricarbonitrile, 1,3,5-Pentanetricarbonitrile; a chemical compound containing dimethylformamide can be used. In particular, a solvent in which some of H is substituted by F is desirably used. Furthermore, one of the above or a combination of some of the above can be used. In particular, a solvent in which cyclic carbonate and chain carbonate are combined and a solvent in which a chemical compound further containing a small amount of nitrile in the above and a chemical compound further containing a small amount of ether in the above are combined are desirable.

Furthermore, as a nonaqueous solvent of the nonaqueous electrolyte, an ionic liquid can be used as well. In such a case, while there are no particular limitations for cationic species and anionic species, from the viewpoint of low viscosity, electrochemical stability, and hydrophobicity, a combination using pyridinium cation, imidazolium ion, and class 4 ammonium cation is especially desirable for cation, and a combination using fluorine-containing imide-based anion is especially desirable for anion.

Moreover, as a solute used in the nonaqueous electrolyte, a known lithium salt conventionally and generally used in a nonaqueous electrolyte secondary battery can be used. Furthermore, lithium salt containing at least one element among P, B, F, O, S, N, C, and Cl can be used. Specifically, lithium salt such as $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, $LiClO_4$, $LiPF_2O_2$ and a mixture of the above can be used. In particular, $LiPF_6$ is desirable to increase the high rate charge-discharge characteristics and the durability of the nonaqueous electrolyte secondary battery.

Furthermore, as the solute, lithium salt in which the anion is an oxalate complex can be used as well. As the lithium salt in which the anion is an oxalate complex, other than LiBOB (lithium bis-oxalate borate), lithium salt containing anion in which $C_2O_4^{2-}$ is coordinated as the central atom, for example, lithium salt expressed as $Li[M(C_2O_4)_xR_y]$ (in the formula, M is a transition metal, an element selected from group 13, group 14, and group 15 in the periodic table, R is a group selected from halogen, an alkyl group, a halogen-substituted alkyl group, x is a positive integral number, y is 0 or a positive integral number). Specifically, there are $Li[B(C_2O_4)F_2]$, $Li[P(C_2O_4)F_4]$, $Li[P(C_2O_4)_2F_2]$ and the like. However, it is most desirable to use LiBOB to form a stable coat on the surface of the negative electrode even under a high-temperature environment.

Note that the solute described above not only may be used alone, two or more may be mixed and used. Furthermore, while the concentration of the solute is not limited to any concentration in particular, it is desirably 0.8 to 1.7 mol per 1 liter of nonaqueous electrolyte. Furthermore, in applications requiring a discharge of a large electric current, the concentration of the solute described above is desirably 1.0 to 1.6 mol per 1 liter of nonaqueous electrolyte.

As described above, in the sealed battery 10 of the present embodiment, the positive electrode tabs 18 extended out from the electrode body 16 are joined to the first end portion 34a of the positive electrode collector member 34, and the outer peripheral portion of the inversion plate 42 is joined to the peripheral portion of the accommodating recess 35 formed in the second end portion 34b of the positive electrode collector member 34. Furthermore, the inner peripheral portion of the inversion plate 42 is joined to the fragile portion 52 positioned in the center area of the marking plate 48, a portion in the inversion plate 42 positioned on the outer peripheral side of the fragile portion 52 is joined to the lower end portion of the columnar member 36b, and the upper end portion of the columnar member 36b is joined to the cylindrical member 36a at an outer portion of the battery. With the above configuration, ultrasonic joining can be performed while only the positive electrode tabs 18 and the positive electrode collector member 34 are interposed between the ultrasonic horn and the anvil; accordingly, joining can be performed in a desirable manner compared with other resistance welding and laser welding.

Note that the present disclosure is not limited to the embodiment and the modifications described above and various changes and modifications can be made within the scope of the items described in the claims of the present application.

Figure 17:
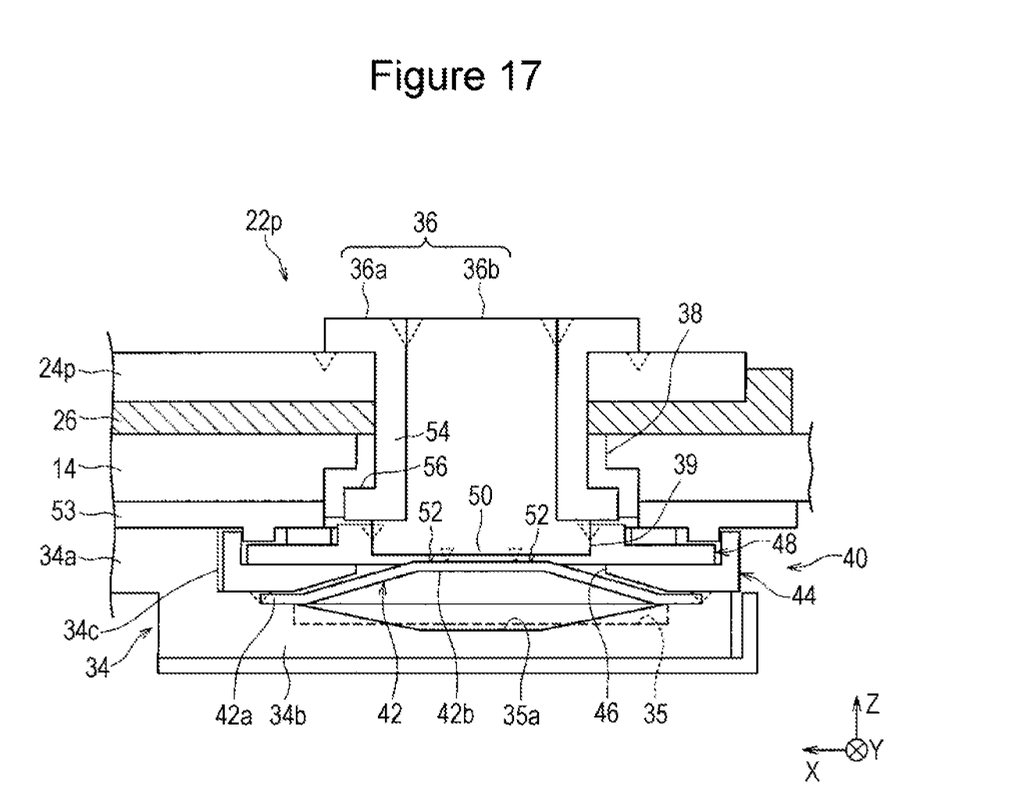
FIG. 17 A cross-sectional view similar to that of FIG. 2, which illustrates a modification of an accommodating recess formed in a collector member.

For example, in the above description, a case in which the accommodating recess 35 formed inside the second end portion of the positive electrode collector member 34 in the thickness direction is formed in a shape including a flat columnar-shaped space has been described; however, the present disclosure is not limited to the above. For example, as illustrated in FIG. 17, an accommodating recess 35a may be formed in a shape including a flat truncated cone-shaped space. As in the above manner, by forming the accommodating recess 35 in a shape including a flat bottom surface and an inclined lateral wall surface, the rigidity of the bottom portion of the accommodating recess 35a becomes higher. Accordingly, even when the thickness of the bottom portion is made smaller compared to a case in which the shape includes a flat columnar-shaped space, it is less likely to become flexed by the pressure inside the battery acting from the lower side towards the upper side. As a result, a space with a depth sufficient enough to maintain a state in which the inverted and deformed inversion plate 42 is accommodated can be obtained.

Furthermore, in the sealed battery 10 described above, an example in which the current breaking mechanism 40 is provided in the positive electrode terminal portion 22p has been described; however, the breaking mechanism may be provided in the negative electrode terminal portion 22n.

REFERENCE SIGNS LIST 10 sealed battery
12 case
14 lid member
15 injection hole
16 electrode body
17a positive electrode plate
17b negative electrode plate
17c separator
18 positive electrode tab (electrode tab)
20 negative electrode tab (electrode tab)
22n negative electrode terminal portion
22p positive electrode terminal portion
24n negative electrode external terminal
24p positive electrode external terminal
26, 33, 37, 53 insulating member
28 negative electrode collector member
30, 36 conductor member
32, 38 gasket
34 positive electrode collector member
34a first end portion
34b second end portion
34c step portion
35, 35a accommodating recess
36a cylindrical member
36b columnar member
39 flange portion
40 current breaking mechanism
42 inversion plate (conductive plate)
42a outer peripheral portion
42b inner peripheral portion
44 spacer member
46 opening portion
48 marking plate (breaking plate)
50 fitted recessed portion
52 fragile portion
54 cylindrical portion
56 lower flange portion
60 through hole
62 pin portion
R laser

The invention claimed is:

1. A sealed battery comprising:
a case including an opening portion;
an electrode body housed in the case;
a lid member that seals the opening portion of the case;
an external terminal provided on an outer surface of the lid member;

a collector member in which a first end thereof is electrically connected to an electrode tab extended out from the electrode body and in which a second end thereof is electrically connected to a current breaking mechanism provided inside the battery; and a conductor member provided so as to penetrate through the lid member in an airtight state such that an inside space between the conductor member and the current breaking mechanism is hermetically separated from an outside of the battery, in which, inside the battery, the conductor member is electrically connected to the current breaking mechanism, and outside the battery, the conductor member is electrically connected to the external terminal, wherein the current breaking mechanism includes a thin plate-like conductive plate in which an outer peripheral portion thereof is directly connected to the collector member and in which an inner peripheral portion thereof, radially inward from the outer peripheral portion, is directly connected to the conductor member, the inner peripheral portion of the conductive plate is formed in a shape protruding from a surface of the collector member, the conductive plate is configured such that, upon an increase in pressure inside the battery, the inner peripheral portion becomes displaced in a direction toward the electrode body under increased pressure in the inside space between the conductor member and the current breaking mechanism, so as to become separated from the conductor member distinct from the collector member, thereby interrupting current flow between the collector member and the conductor member, while the outer peripheral portion maintains contact with the collector member, and an accommodating recess configured to receive the inner peripheral portion of the conductive plate separated and displaced from the conductor member upon said increase in pressure inside the battery is formed in the collector member and in a thickness direction of the collector member.

2. The sealed battery according to claim 1, wherein the accommodating recess is formed in a shape including a flat columnar-shaped space or a flat truncated cone-shaped space.

3. The sealed battery according to claim 1, wherein the conductor member includes a conductive cylindrical member and a conductive columnar member disposed inside the cylindrical member, the inner peripheral portion of the conductive plate is coupled to an end portion of the columnar member on a first side through a breaking plate that includes a thin-walled fragile portion.

4. The sealed battery according to claim 1, wherein a gasket that seals an inside of the battery and an outside of the battery from each other in an airtight state is disposed on an outer peripheral surface of the cylindrical member.

5. The sealed battery according to claim 3, wherein the electrode tab extended out from the electrode body is joined to a first end portion of the collector member, the outer peripheral portion of the conductive plate is joined to a peripheral portion of the accommodating recess formed in a second end portion of the collector member, the inner peripheral portion of the conductive plate is joined to the fragile portion positioned at a center area of the breaking plate, a portion in the breaking plate positioned on an outer peripheral side of the fragile portion is joined to an end portion of the columnar member on a first side, and an end portion of the columnar member on a second side is joined to the cylindrical member at a portion outside the battery.

6. The sealed battery according to claim 1, wherein the conductive plate is interposed between the conductive member and the collector member in the thickness direction of the collector member.

7. The sealed battery according to claim 1, wherein the inner peripheral portion of the conductive plate is configured to stay outside the accommodating recess prior to said increase in pressure inside the battery.

\* \* \* \* \*